(12) United States Patent
Kozodeev et al.

(10) Patent No.: US 10,683,724 B2
(45) Date of Patent: Jun. 16, 2020

(54) CURING A LOST CIRCULATION ZONE IN A WELLBORE

(71) Applicant: Saudi Arabian Oil Company, Dhahran (SA)

(72) Inventors: Sergei Kozodeev, Abqaiq (SA); Pavel Golikov, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/700,704

(22) Filed: Sep. 11, 2017

(65) Prior Publication Data

US 2019/0078417 A1 Mar. 14, 2019

(51) Int. Cl.
*E21B 33/138* (2006.01)
*C09K 8/40* (2006.01)
*C09K 8/50* (2006.01)
*C09K 8/42* (2006.01)

(52) U.S. Cl.
CPC .............. *E21B 33/138* (2013.01); *C09K 8/40* (2013.01); *C09K 8/42* (2013.01); *C09K 8/50* (2013.01)

(58) Field of Classification Search
CPC .................................................... E21B 33/138
USPC ........................................................ 166/292
See application file for complete search history.

(56) References Cited

U.S. PATENT DOCUMENTS

| | | | |
|---|---|---|---|
| 4,498,995 A | 2/1985 | Gockel | |
| 4,584,327 A | 4/1986 | Sutton | |
| 4,627,496 A * | 12/1986 | Ashford | E21B 33/13 166/291 |
| 4,643,255 A | 2/1987 | Sandiford et al. | |
| 4,935,060 A | 6/1990 | Dingsoyr | |
| 5,027,900 A * | 7/1991 | Wilson | E21B 33/16 166/153 |
| 5,030,366 A | 7/1991 | Wilson et al. | |
| 5,086,841 A | 2/1992 | Reid et al. | |
| 5,325,921 A | 7/1994 | Johnson et al. | |
| 5,402,849 A | 4/1995 | Jennings, Jr. | |
| 5,789,352 A | 8/1998 | Carpenter et al. | |

(Continued)

FOREIGN PATENT DOCUMENTS

| | | |
|---|---|---|
| EP | 0 445 941 A1 | 9/1991 |
| WO | WO-9927032 A1 | 6/1999 |

(Continued)

OTHER PUBLICATIONS

Datwani, A., Review of Lost Circulation Mechanisms with the Focus on Loss to Natural and Drilling Induced Fractures, Dalhousie University, Halifax, Nova Scotia, 92 pages (Jul. 2012).

(Continued)

*Primary Examiner* — Silvana C Runyan
(74) *Attorney, Agent, or Firm* — Choate, Hall & Stewart LLP; Charles E. Lyon; Alexander D. Augst

(57) ABSTRACT

An example method includes pumping fluid into a wellbore to fill, at least partly, a region in a lost circulation zone, with the fluid having a first density; and after pumping the fluid, pumping cement slurry into the wellbore. The cement slurry has a second density. The first density is greater than, or equal to, the second density, which causes the fluid to prevent, at least partly, the cement slurry from mixing with other fluid in the lost circulation zone for at least a period of time.

19 Claims, 7 Drawing Sheets

(56) References Cited

U.S. PATENT DOCUMENTS

| | | | |
|---|---|---|---|
| 6,489,270 B1 * | 12/2002 | Vollmer | C09K 8/08 166/292 |
| 6,548,452 B1 | 4/2003 | Nattier et al. | |
| 6,742,592 B1 | 6/2004 | Le Roy-Delage et al. | |
| 6,765,153 B2 | 7/2004 | Goodson | |
| 6,790,812 B2 | 9/2004 | Halliday et al. | |
| 7,219,732 B2 | 5/2007 | Reddy | |
| 7,303,008 B2 | 12/2007 | Badalamenti et al. | |
| 7,740,070 B2 | 6/2010 | Santra et al. | |
| 7,963,323 B2 | 6/2011 | Bailey | |
| 7,964,413 B2 | 6/2011 | Macioszek et al. | |
| 8,820,405 B2 | 9/2014 | Turner et al. | |
| 9,062,241 B2 | 6/2015 | Zamora et al. | |
| 2006/0254770 A1 * | 11/2006 | Hou | C09K 8/40 166/291 |
| 2006/0272819 A1 * | 12/2006 | Santra | C04B 28/02 166/292 |
| 2007/0017676 A1 | 1/2007 | Reddy et al. | |
| 2008/0023200 A1 | 1/2008 | Reddy et al. | |
| 2008/0196628 A1 | 8/2008 | Santra et al. | |
| 2009/0178809 A1 | 7/2009 | Jeffryes et al. | |
| 2009/0186781 A1 | 7/2009 | Zhang | |
| 2009/0192052 A1 | 7/2009 | Zhang | |
| 2009/0194330 A1 | 8/2009 | Gray | |
| 2009/0308611 A1 | 12/2009 | Santra et al. | |
| 2009/0312203 A1 | 12/2009 | Huang | |
| 2014/0202768 A1 * | 7/2014 | Noske | E21B 34/06 175/57 |
| 2015/0267501 A1 | 9/2015 | Al-Gouhi | |
| 2016/0251938 A1 | 9/2016 | Murray et al. | |

FOREIGN PATENT DOCUMENTS

| | | |
|---|---|---|
| WO | WO-2004057150 A1 | 7/2004 |
| WO | WO-2012143687 A1 | 10/2012 |
| WO | WO-2014055402 A1 | 4/2014 |
| WO | WO-2014120458 A1 | 8/2014 |
| WO | WO-2017034637 A1 | 3/2017 |

OTHER PUBLICATIONS

Finger, J. T. and Livesay, B., Alternative Wellbore Lining Methods: Problems and Possibilities, Sand Report, Sandia National Laboratories, 35 pages (printed Aug. 2002).

International Search Report for PCT/IB2018/056589, 4 pages (dated Jan. 16, 2019).

Written Opinion for PCT/IB2018/056589, 8 pages (dated Jan. 16, 2019).

Written Opinion of the International Preliminary Examining Authority for PCT/IB2018/056589, 8 pages (dated Aug. 29, 2019).

International Preliminary Report on Patentability for PCT/IB2018/056589, 19 pages (dated Nov. 27, 2019).

* cited by examiner

CURING A LOST CIRCULATION ZONE IN A WELLBORE

TECHNICAL FIELD

This specification relates generally to example processes for curing a lost circulation zone in a wellbore.

BACKGROUND

In a well, such as an oil well, a lost circulation zone is a region in a subterranean formation that inhibits, or prevents, return of mud or other materials following introduction of drilling fluid. For example, during drilling and completion of a well, drilling fluid is introduced into the wellbore. Then, mud and other materials from the wellbore flow back to the surface of the well. However, in a lost circulation zone, the introduction of drilling fluid into the wellbore does not produce a corresponding flow back to the surface of the well.

There can be various causes for lost circulation zones. In some cases, the formation may have high permeability, may have a high porosity and may have a less-than-normal hydrostatic pressure. In some cases, the formation may contain faults, such as fractures, into which the drilling fluid escapes, thereby interrupting the circulation of fluids out of a wellbore. Such lost circulation zones can adversely affect forward drilling operations.

In some cases, in order to continue drilling the well to a target depth or to a next casing point, these lost circulation zones should be remedied. In some cases, lost circulation material (LCM) pills, cement plugs, and X-linked polymer plugs have be used in attempts to remedy lost circulation zones.

SUMMARY

An example method for at least partially curing a lost circulation zone includes pumping fluid into a wellbore to fill, at least partly, a region in a lost circulation zone, where the fluid has a first density; and after pumping the fluid, pumping cement slurry into the wellbore. The cement slurry has a second density. The first density is greater than, or equal to, the second density, which causes the fluid to prevent, at least partly, the cement slurry from mixing with other fluid in the lost circulation zone for at least a period of time to allow the slurry to harden. The example method may include one or more of the following features, either alone or in combination.

The fluid may be a first fluid. The example method may include forming the wellbore by drilling through a formation using a second fluid. The second fluid may have a third density, and the first density may be greater than the third density. Pumping the first fluid may cause the first fluid to displace at least part of the second fluid in the wellbore.

The lost circulation zone may include at least part of a formation containing formation fluid, which may constitute the other fluid. The first fluid may enter the formation and may force at least part of the formation fluid away from a region adjacent to the wellbore. The first fluid may isolate, at least partly, the formation fluid from the cement slurry. The fluid pumped may have a first viscosity and the formation fluid may have a second viscosity. The first viscosity may be greater than the second viscosity.

The fluid pumped-in may prevent the cement slurry from mixing with the other fluid in the lost circulation zone for sufficient time to allow the cement slurry to harden into cement. Pumping the cement slurry may be performed immediately following pumping the fluid. The period of time may be an amount of time that it takes for the cement slurry to set to a threshold amount.

An example method is used to form a well through a subterranean formation having a fracture containing a formation fluid. The example method includes pumping a first fluid into a wellbore of the well to force at least some of the formation fluid away from a region of the subterranean formation that is adjacent to the wellbore, with the first fluid having a first density. The example method also includes pumping cement slurry into the wellbore so that the cement slurry is at least adjacent to the first fluid. The cement slurry has a second density. The first density may be greater than the second density, which causes the first fluid to act as a barrier, at least partly, between the formation fluid and the cement slurry for at least a period of time that is based on a setting time for the cement slurry. The example method may include one or more of the following features, either alone or in combination.

The first fluid may have a first viscosity and the formation fluid may have a second viscosity. The first viscosity may be greater than, or equal to, the second viscosity. The period of time may be long enough to enable the cement slurry to set to a threshold amount. The first fluid may be pumped into the wellbore by a pumping mechanism. The pumping mechanism may operate at a maximum pump speed to pump the fluid. Pumping the cement slurry may be performed immediately following pumping the first fluid. Pumping the first fluid and pumping the cement slurry may be part of a single continuous operation.

A volume of the cement slurry that is pumped may be based on an amount of the cement slurry needed to fill a lost circulation zone that includes the region of the subterranean formation. The fracture may be part of a lost circulation zone in the wellbore. The formation fluid may have a third density. The second density may be greater than the third density.

An example system includes a detector to identify a lost circulation zone in a wellbore of a well; and one or more pumps that are controllable to perform operations that include: pumping first fluid into the wellbore to fill at least part of the lost circulation zone, with the first fluid having a first density; and pumping cement slurry into the wellbore. The cement slurry has a second density. The first density is greater than the second density causing the first fluid at least partly to prevent the cement slurry from mixing with other fluid in the lost circulation zone for at least a period of time. The example system may include one or more of the following features, either alone or in combination.

The example system may include a casing inside at least part of the wellbore. The wellbore may extend through a subterranean formation having a feature that causes the lost circulation zone. The lost circulation zone may contain formation fluid, and the other fluid may constitute the formation fluid. The example system may include a cement retainer connected to the casing to direct the cement slurry into the wellbore. The one or more pumps may be controllable to pump the first fluid into the wellbore using a force that is sufficient to cause the first fluid to enter the feature and to displace at least some of the formation fluid at a region of the feature that is adjacent to the wellbore. The one or more pumps may be controllable to pump the cement slurry using a force that is sufficient to cause at least some of the cement slurry to enter the feature between the first fluid and wellbore.

The detector may include a computing system programmed to receive information representing flow of fluid out of the wellbore following flow of fluid into the wellbore. The period of time may be an amount of time that it takes for the cement slurry to set to a threshold amount. The period of time may be at least two hours, at least three hours, at least four hours, or at least five hours. The first fluid may have a first viscosity. The other fluid may have a second viscosity. The first viscosity may be greater than the second viscosity.

Any two or more of the features described in this specification, including in this summary section, may be combined to form implementations not specifically described in this specification.

All or part of the processes, methods, systems, and techniques described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. All or part of the processes, methods, systems, and techniques described in this specification may be controlled using a computing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example processes for curing a lost circulation zone in a wellbore using high-density fluid and cement slurry. In some implementations, the high-density fluid includes fluid comprised of water- or oil-based mud; however, any appropriate fluids may be used. In some implementations, high-density fluid includes any fluid having a density that is greater than, or equal to, a density of cement slurry that is used in cementing operations. As described subsequently, the high-density fluid is pumped into a lost circulation zone of the wellbore, and enters into subterranean formations in the lost circulation zone. The high-density fluid displaces fluid in the formation, referred to as formation fluid, by forcing the formation fluid from a region proximate to the wellbore further into the formation. Cement slurry is then pumped into the lost circulation zone of the wellbore. The cement slurry has a density that is less than, or equal to, a density of the high-density fluid, and fills a space in the wellbore adjacent to the high-density fluid. Because the high-density fluid has a density that is greater than, or equal to, a density of the cement slurry, the buoyancy effect causes the high-density fluid to inhibit migration, dilution, and contamination of the cement slurry.

Migration, dilution, and contamination may continue at a contact area between the high-density fluid and formation fluid inside of the lost circulation zone, away from the cement slurry. The high-density fluid, however, acts as a barrier or buffer between the formation fluid and the cement slurry. Interaction between the high density fluid and the formation fluid occurs through substitution of one liquid for the other, providing appropriate time to allow the cement slurry to set, or to harden. In some implementations, after the cement slurry hardens, the wellbore is effectively isolated from the lost circulation zone, allowing to continue the drilling operation.

The time needed for the cement slurry to achieve a predefined hardness may vary based on a number of conditions including, but not limited to, the composition of the cement slurry, the temperature in the wellbore, and the pressure in the wellbore. In some examples, it may take two to twelve hours for cement slurry to set; however, that number may be different for different conditions. In some implementations, setting of the cement slurry may include hardening to less than complete hardness of cement. In some implementations, setting of the cement slurry may include hardening to complete hardness of cement.

Figure 1:
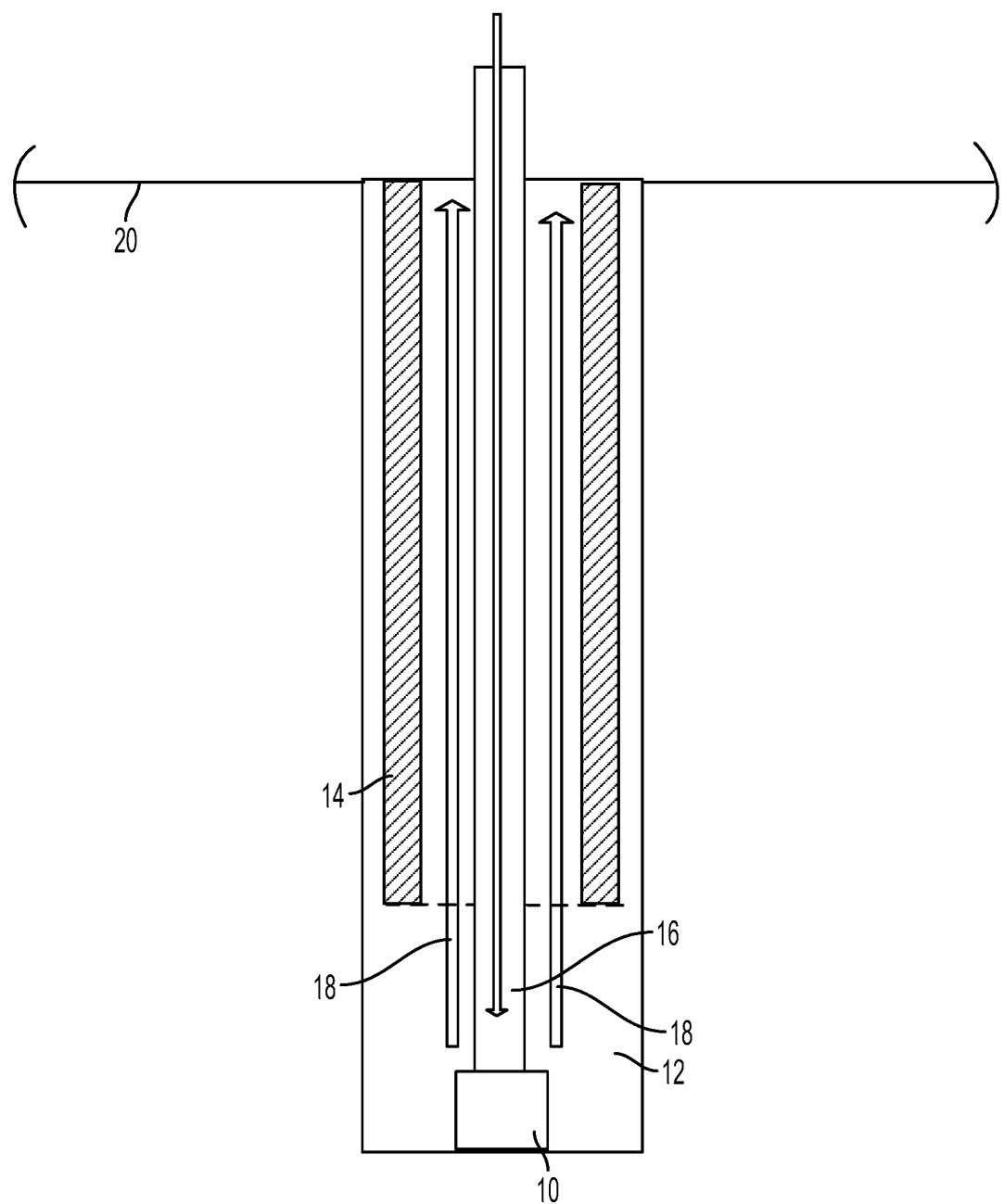
FIG. 1 is a cross-section of an example wellbore having normal circulation.

Referring to FIG. 1, to produce a well, a drill 10 bores through earth, rock, and other materials to form a wellbore 12. A casing 14 supports the sides of the wellbore. The drilling process includes, among other things, pumping drilling fluid 16 down into the wellbore, and receiving return fluid 18 containing materials from the wellbore at surface 20. In some implementations, the drilling fluid includes water- or oil-based mud and, in some implementations, the return fluid contains mud, rock, and other materials to be evacuated from the wellbore. This circulation of fluid into, and out of, the wellbore, may occur throughout the drilling process. In some cases, this circulation is interrupted, which can have an adverse impact on drilling operations. For example, loss of circulation can result in dry drilling, which can damage the open hole, and result in possible loss of the open hole and the drilling bottom hole assembly, the drill string, or the drilling rig itself. In some cases, loss of circulation can cause a blow-out and result in loss of life.

There are degrees of lost circulation that may result. For example, a total loss of circulation occurs when no return fluid reaches the surface following introduction of drilling fluid into the wellbore. A partial loss of circulation occurs when than a predefined minimum amount of return fluid reaches the surface following introduction of drilling fluid into the wellbore. In some implementations, the techniques described in this specification may be used to cure a total loss of circulation. However, the techniques are not limited only to curing total losses of circulation, and may also be used to cure less than total—or partial—losses of circulation. Generally, the techniques may be applied to cure any appropriate types of loss of circulation; however, each situation is unique and should be considered addressed based on its conditions.

A total loss of circulation may result from faults, such as fractures, in a subterranean formation. Other causes of lost circulation also exist. In the example shown in FIG. 2, the drilling fluid, the return fluid, or both may escape into fractures, such as fracture 22, in a surrounding formation 24, causing the loss of circulation. Depending upon the size of the fracture and the volume of fluids involved, the escaping fluids may cause a total loss in circulation.

In some implementations, a lost circulation zone may be identified based on the volume of return fluid removed from a wellbore. For example, the volume of return fluid, if any, may be measured using one or more detection mechanisms, and compared to an expected volume of return fluid for a given amount of drilling fluid pumped into the wellbore. If the amount of return fluid deviates by more than a threshold amount from the expected amount of return fluid for a given depth in a wellbore, a lost circulation zone is detected. In some implementations, computer programs may be used to process information about the volumes of drilling fluid and return fluid, and to make a determination about whether a lost circulation zone has been encountered. In some implementations, this determination may be made in real-time (such as during drilling) so that the situation can be remedied before damage occurs. In some implementations, the computer programs may be used to alert drilling engineers about a detected lost circulation zone, to begin automatic remedies, or both. In some implementations, a lost circulation zone may be detected using other methods based on the quantity or quality of the return fluid.

In some implementations, lost circulation zones may be remedied, at least in part, using the cementing operations described in this specification. In this regard, drilling cuts through rock formations to form a wellbore that reaches a subterranean reservoir. Cementing operations may be used to cure a lost circulation zone by pumping cement slurry into the wellbore, and allowing the cement slurry to set, or harden. Following setting, as described, all or some of the drilling fluid may be prevented from escaping into the lost circulation zone during drilling.

Figure 3:
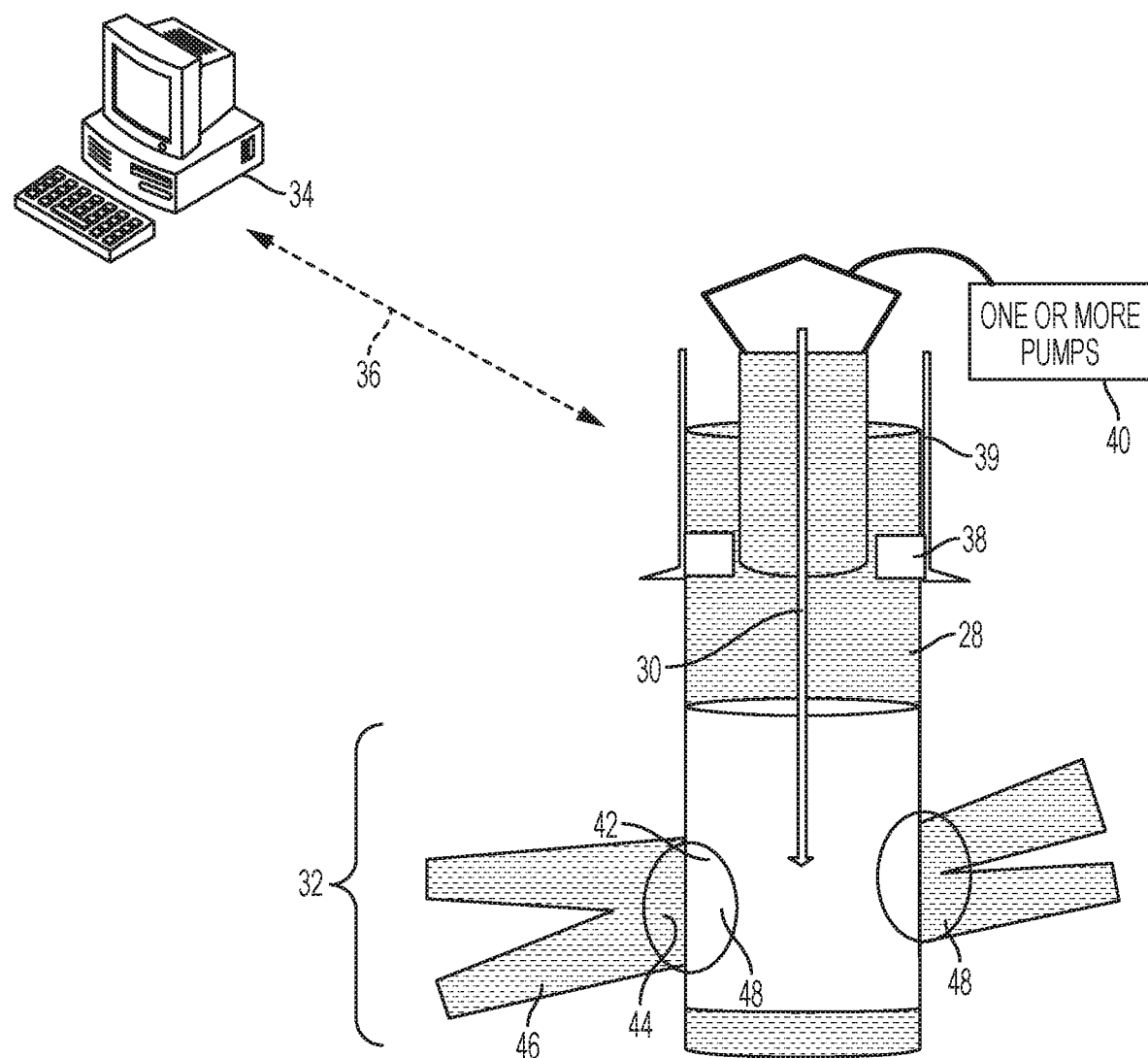
FIG. 3 is a cross-section of an example wellbore containing cement slurry in a lost circulation zone of the wellbore.

FIG. 3 shows an example wellbore 28. In the example of FIG. 3, cement slurry is pumped along path 30 to fill a detected lost circulation zone 32. As described in this specification, a computer system, such as computer system 34, may be programmed to detect the lost circulation zone based on information 36 obtained from sensors inside, or associated with, wellbore 28. The computer system may be programmed also to determine the amounts of high-density fluid and cement slurry to inject into the wellbore, and the times at which the high-density fluid and cement slurry should be injected. Example wellbore 28 also includes a cement retainer 38 in casing 39 to direct the cement slurry. One or more pumps 40 are controllable—computer-controllable or controllable through other mechanisms—to inject the cement slurry into the wellbore, as shown in FIG. 3. In the example of FIG. 3, the cement slurry 42 in the wellbore abuts formation fluid 44 in fracture 46. This results in a zone of contamination 48, in which the cement slurry interacts with the formation fluid. In this environment, the cement slurry adjacent to fracture 46 may be unable to set, and to harden. Instead, in some cases, the cement slurry may recede into the lost circulation zone, without curing the lost circulation zone.

Figure 2:
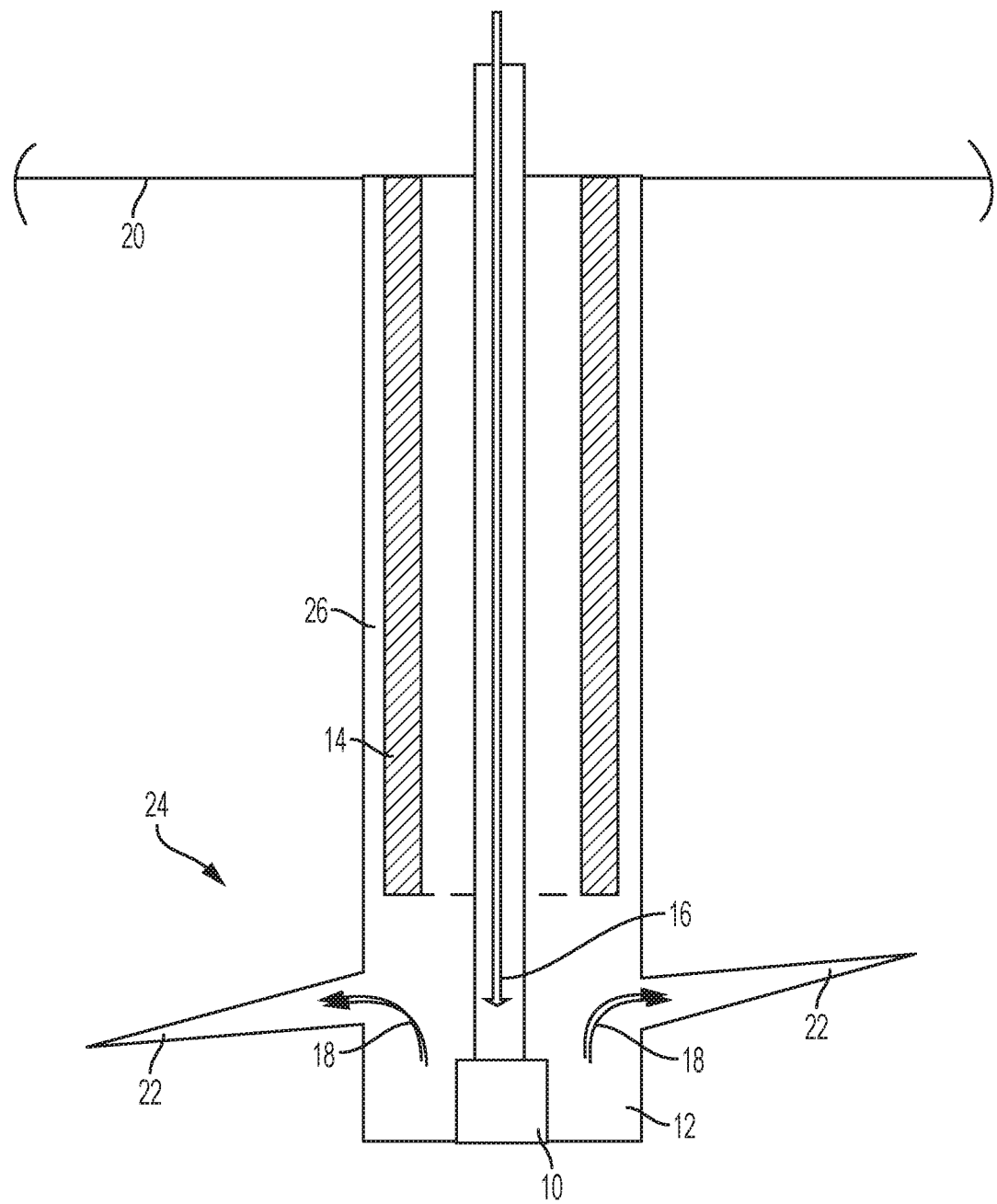
FIG. 2 is a cross-section of an example wellbore that has lost circulation.
Figure 4:
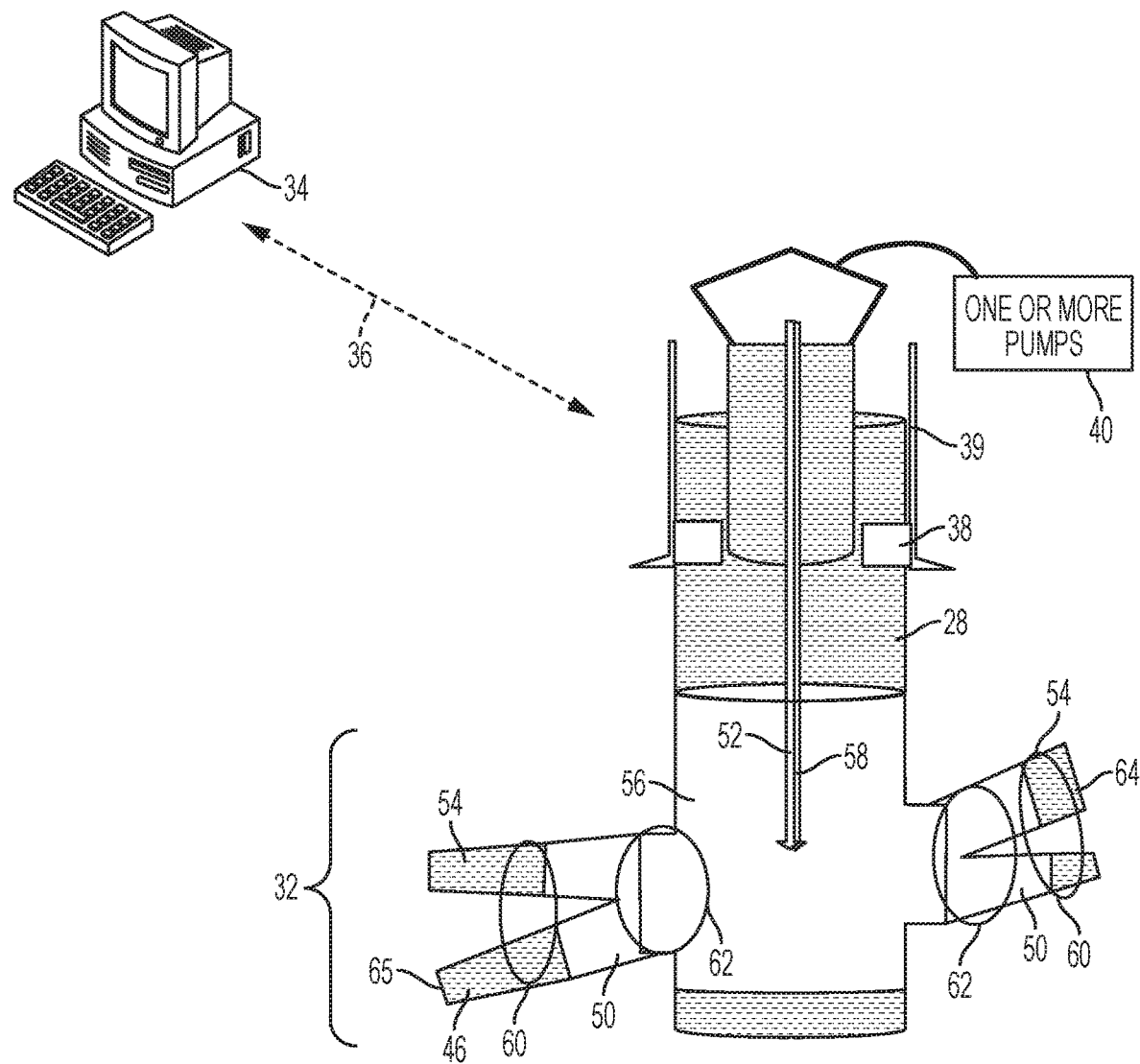
FIG. 4 is a cross-section of an example wellbore containing a high-density fluid between formation fluid and cement slurry in a lost circulation zone of the wellbore.

Referring to FIG. 4, to address issues described with respect to FIGS. 2 and 3, high-density fluid 50 may be pumped into the wellbore prior to pumping cement slurry into the wellbore. As shown in FIG. 4, the high-density fluid 50 fills at least part of a fault, such as fracture 46, in the lost circulation zone 32. The use of the relative term "high" in this context does have any numerical connotation. Rather, the high-density fluid has a density that is greater than, or equal to, a density of the cement slurry, for reasons explained subsequently. The numerical value of the density of the fluid may vary based on any appropriate conditions, such as the density of the cement slurry used, severity of the total losses, the temperature in the wellbore, other environmental conditions, and so forth. In some implementations, the density of the high-density fluid is within a range of 65 PCF (pounds per cubic foot) to 130 PCF; however, as noted previously, the appropriate density for that high-density fluid may vary based on various conditions, such as cementing conditions. Examples of high-density fluid that may be used include, but are not limited to, oil-based mud and water-based mud. Any appropriate high-density fluid may be used including, but not limited to, high-density drilling fluid.

In some implementations, the high-density fluid may also have a viscosity that is greater than, or equal to, a viscosity of the formation fluid or of any other fluid that is already located in the well. As was the case for density, the use of the relative term "high" in this context does have any numerical connotation. Rather, the numerical value of the viscosity of the high-density fluid may vary based on any appropriate conditions, such as the type and viscosity of the drilling fluid or formation fluid in the wellbore, the pressure in the wellbore, the temperature in the wellbore, the type of rock formations that are encountered during drilling, and so forth.

One or more pumps 40 force the high-density fluid into the wellbore along path 52 and, from there, into the lost circulation zone 32. In some implementations, the one or more pumps operate at a maximum pump speed to force the high-density fluid into the wellbore; however, the high-density fluid may be pumped at any appropriate rate. As shown in FIG. 4, the high-density fluid may be pumped into the wellbore along a same path as normal, lower-density drilling fluid. The high-density fluid may be pumped with sufficient force to displace remaining normal, lower-density drilling fluid in the wellbore. In this regard, in response to the high-density fluid, the normal drilling fluid—to the extent that any remains—may be forced into fractures or other faults in the lost circulation zone.

In some implementations, the high-density fluid may be pumped into the wellbore using a force, and at a volume, that is sufficient to cause the high-density fluid to fill the lost circulation zone completely, to enter one or more fractures in the lost circulation zone, and to force at least some of the formation fluid in each fracture away from a region that is adjacent to the wellbore. In this regard, referring, for example, to FIG. 4, fracture 46 in lost circulation zone 32 may contain formation fluid 54. The formation fluid may be native to the lost circulation zone, and may be fluid such as hydrocarbons or water, or the formation fluid may be, or include, fluid that has been introduced into the fracture during drilling, such as normal drilling fluid. In any case, high-density fluid 50 may be pumped, using sufficient volume and force, to reach the lost circulation zone, and to enter formation 46, as shown. Upon entry into the formation, high-density fluid 50 forces formation fluid 54 away from the wellbore, and further into the fracture. In some implementations, the high-density fluid may have a density that is greater than a density of the formation fluid. In some implementations, the high-density fluid may have a density that is less than the density of the formation fluid. As described, the high-density fluid in the fracture acts as a barrier, of buffer, between the cement slurry and formation fluid.

The amount of high-density fluid to be pumped into the wellbore may vary based on conditions, such as a size of the wellbore, a degree of lost circulation, a size of the lost circulation zone, and so forth. In some implementations, the amount of high-density fluid pumped into the wellbore may be in the range of 700 barrels (bbl) to 2000 bbl; however, as noted, this number may vary based on conditions encountered.

In some implementations, the barrier produced by high-density fluid 50 is temporary. For example, in some cases, the high-density fluid may eventually mix with formation fluid 54, dissipate, and escape into the fracture or elsewhere into the formation. Accordingly, the high-density fluid may be selected or produced based on conditions present in a particular wellbore. For example, a type of high-density fluid may be selected or produced so that at least some of the high-density fluid remains intact in the fracture to act as a barrier long enough for the cement slurry to set to a threshold hardness. In this regard, some cement slurries takes hours to set, for example, to harden to a point where the cement slurry loses a threshold amount of its plasticity. Accordingly, in cases where the cement slurry takes, for example, about four to five hours to set, a high-density fluid may be selected that is able to maintain a barrier between the formation fluid and the cement slurry for at least four hours. In some implementations, the cement slurry setting time may be more than, or less than, four hours, in which case an appropriate high-density fluid may be used that is able to maintain a barrier between the formation fluid and the cement slurry for at a different period of time, for example, longer or shorter than four hours.

Following introduction of the high-density fluid into the wellbore, cement slurry 56 is pumped into the wellbore along path 58. The volume of cement slurry used may be sufficient to cover any appropriate part of the wellbore, such as the entire lost circulation zone 32 or a part of the lost circulation zone 32. The amount of cement slurry to be pumped into the wellbore may be regulated based on conditions such as a size of the wellbore, a degree of lost circulation, a size of the lost circulation zone, and so forth. In some implementations, the amount of cement slurry to be pumped into the wellbore may be about 300 bbl; however, as noted, this number will vary based on conditions encountered. In some implementations, the cement slurry is to produce a cemented area in a lost circulation zone around an open hole. In some implementations, the layer of cement produced from the cement slurry is hard enough not to collapse during drilling caused by vibration of the drill bit and the drill string. Also, the layer of cement produced from the cement slurry is sufficient to withstand significant differential pressure between a subnormal formation pressure and hydrostatic pressure of a mud column during drilling. In some implementations, the layer of cement produced from the cement slurry is produced to shut an open hole in the lost circulation zone.

In some implementations, the cement slurry has a density that is lower than the density of the high-density fluid 50 that is present inside the formation in the lost circulation zone, such as a formation 46. As a result, the high-density fluid, in total or at least in part, isolates the cement slurry 56 from the formation fluid 54. For example, the high-density 50 fluid prevents, in whole or part, the cement slurry 56 from mixing with the formation fluid 54 in the formation 46 for at least a period of time. Furthermore, because the density of the cement slurry is less than the density of the high-density fluid, any mixing that takes place between the cement slurry and the high-density fluid would take place over a longer period of time than it takes for the cement slurry to set to a predefined hardness.

In this regard, in FIG. 4, zone 60 is where the formation fluid 54 abuts the high-density fluid and zone 62 is where the high-density fluid abuts the cement slurry 56. Due to the density of the high-density fluid, within these zones 60 and 62, there is, at least initially, little mixing of, or displacement of, adjacent materials. As a result, the cement slurry may remain isolated from the formation fluid for at least enough time to allow the cement slurry to set. As explained previously, in example implementations like that shown in FIG. 4, any mixing, dilution, or contamination that takes place between the formation fluid and the high-density fluid takes place over a longer period of time than it takes for the cement slurry to set to the predefined hardness. Accordingly, at least for a period of time, the high-density fluid acts as a barrier to prevent the cement slurry from migrating, and interacting with, other fluids, allowing the cement slurry enough time to set. In this regard, in some implementations, there may be small amounts of formation fluid seeping into the cement slurry, the high-density fluid, or both; however, in general, the amounts are small enough as not to prevent the cement slurry from setting.

In some implementations, pumping the cement slurry into the wellbore immediately follows pumping the high-density fluid into the wellbore. In some implementations, pumping the high-density fluid and pumping the cement slurry may be part of a single continuous operation, starting with pumping the high-density fluid and followed immediately by pumping the cement slurry. In some implementations, different pumps or sets of pumps are used to pump the high-density fluid and the cement slurry into the wellbore. In some implementations, the same pump or set of pumps is used to pump the high-density fluid and the cement slurry into the wellbore. In some implementations, the pump or pumps are computer-controlled based on one or more conditions detected in the well including, for example, the amount of circulation in the well, a pressure detected in the well, a temperature detected in the well, other environmental conditions, and so forth.

To perform the cementing operations, in some implementations as shown in FIG. 4, a cement retainer 38 is set at a shoe of a last casing 39 in the wellbore and operates to direct the cement slurry through a drill pipe and open hole into a region of the lost circulation zone. In some implementations, one or more pumps 40 are configured and controlled to pump the cement slurry into the wellbore using a force that is sufficient to cause all, or at least some, of the cement slurry to enter the lost circulation zone, and to enter any, or all, fractures, such as fracture 46. In some implementations, one or more pumps are configured and controlled to pump the cement slurry into the wellbore using a force that is sufficient to cause all, or at least some, of the cement slurry to enter the lost circulation zone, including one or more fractures within the lost circulation zone.

In some implementations, for some fractures, such as portion 65 of fracture 46, gravity may cause the formation fluid and the high-density fluid to recede, at least partly, from the wellbore and into the fracture or elsewhere into the formation. This may be the case, for example, where fractures extend downwardly, towards the Earth's center. In some cases, such as where fractures extend upwardly, away from the Earth's center, such as portion 64, gravity may play less of a role in causing the formation fluid and the high-density fluid to move further into the formation. In any event, as noted, the cement slurry may be pumped into the wellbore using a force that is sufficient to cause at least some of the cement slurry to enter fractures in the lost circulation zone. The amount of cement slurry may be regulated—for example by a computer—so that enough cement slurry is introduced to cover all or part of the lost circulation zone, and to enter one or more fractures. In this regard, in some cases, the cement slurry enters into a fracture 46 and into contact with high-density fluid contained in the fracture. In some implementations, there is sufficient isolation between the high-density fluid and the cement slurry for the cement slurry in the fracture to harden and produce cement. Accordingly, in some implementations, both the sides of the wellbore and the fracture contain hardened cement. The cement slurry in the fracture acts as a further barrier to the cement slurry in the wellbore. In some implementations, the cement slurry in the fracture may harden and thereby increase the stability of the formation. If any unset cement slurry in the fracture remains—for example, cement slurry that did not harden—that slurry may eventually seep into the fracture, along with the high-density fluid.

After the cement slurry hardens to produce the cement bond and seals the lost circulation zone, drilling may continue in the manner described previously. For example, the drilling fluid may be pumped to the drill bit at the bottom of the wellbore. The cementing of the lost circulation zone restores circulation to the well, allowing return fluid, including mud and other materials, to reach the surface following pumping of the normal, lower-density drilling fluid.

Figure 5:
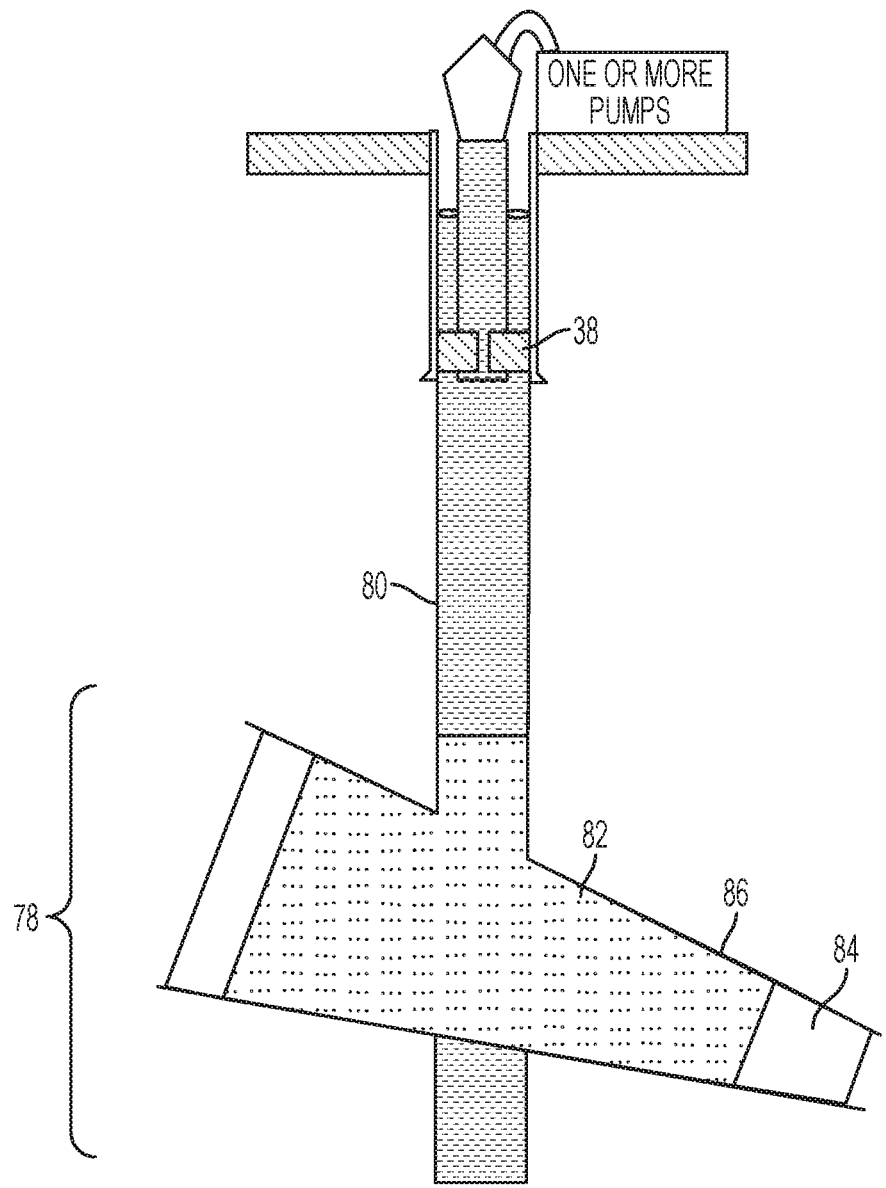
FIG. 5 is a cross-section of an example wellbore illustrating a first stage of curing a lost circulation zone by pumping high-density fluid into the wellbore.
Figure 6:
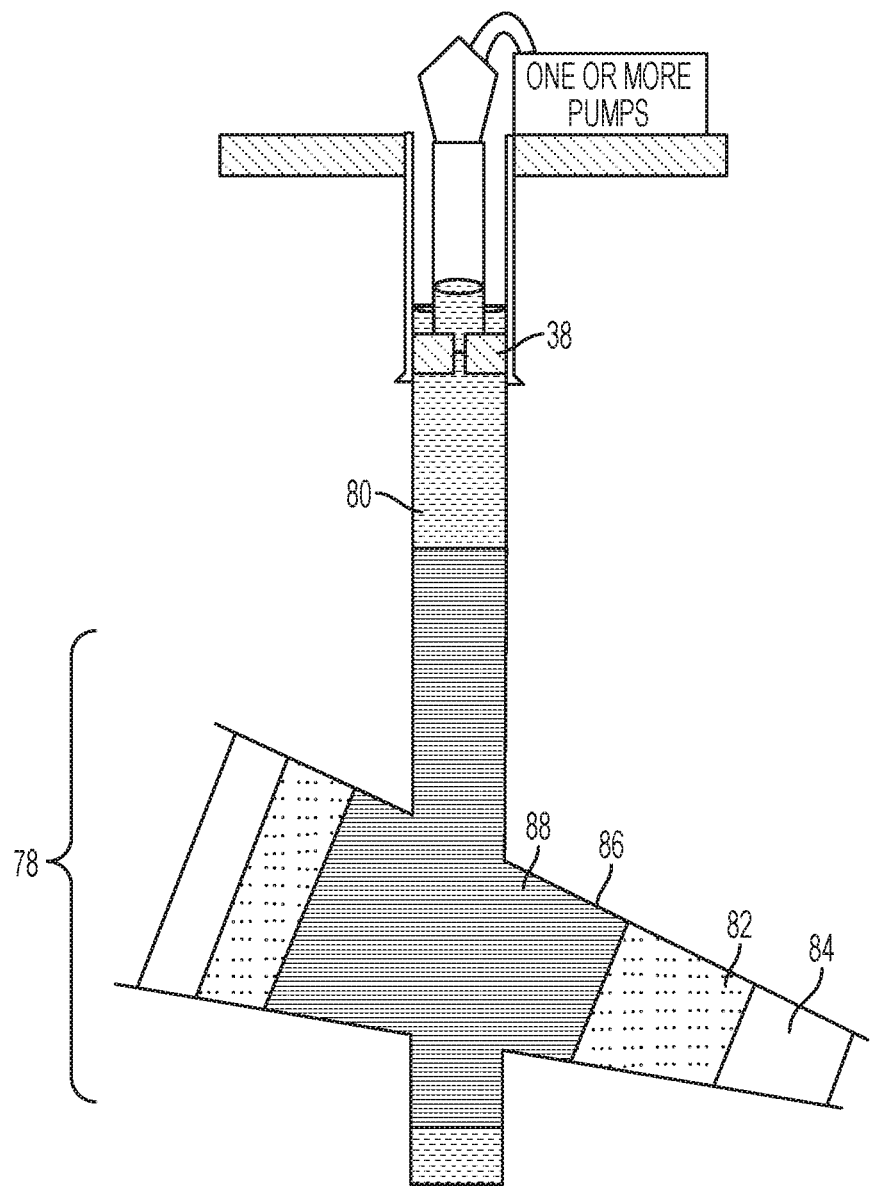
FIG. 6 is a cross-section of an example wellbore illustrating a second stage of curing a lost circulation zone by pumping cement slurry into the wellbore.
Figure 7:
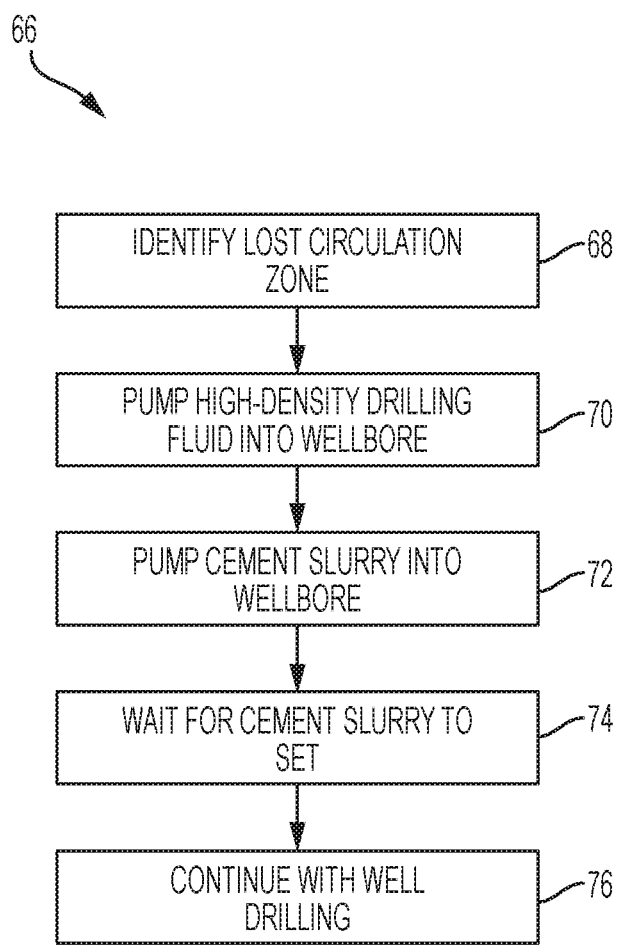
FIG. 7 is a flowchart showing an example process for curing a lost circulation zone in a wellbore.

Referring to FIGS. 5, 6, and 7, a process 66 is shown for producing at least part of a well using the techniques described previously. Process 66 includes identifying (68) a lost circulation zone. Techniques for identifying the lost circulation zone are described previously. An example lost circulation zone 78 in a wellbore 80 is shown in FIGS. 5 and 6. Process 66 includes pumping (70) high-density fluid 82 into wellbore 80. Techniques for pumping the high-density fluid are described previously. FIG. 5 shows the high-density fluid 82 in the wellbore. As shown in FIG. 5, the high-density fluid 82 forces formation fluid 84 further into the formation 86. Process 66 includes pumping (72) cement slurry into the wellbore. Techniques for pumping the cement slurry are described previously. As shown in FIG. 6, the cement slurry 88 forces both the high-density fluid 82 and the formation fluid 84 further into the lost circulation zone 86—for example, a fracture—and away from the wellbore. As a result, in this example, the cement slurry 88 occupies both the lost circulation zone and a region of the fracture 86 that is adjacent to the wellbore. Process 66 includes waiting (74) for the cement slurry to set to at least a threshold, which may include full hardening. Drilling (76) of the well may then continue.

Although vertical wellbores are show in the examples presented in this specification, the processes described previously may be implemented in wellbores that are, in whole or part, non-vertical. For example, the processes may be performed for a fracture that occurs in a deviated wellbore, a horizontal wellbore, or a partially horizontal wellbore, where horizontal is measured relative to the Earth's surface in some examples.

All or part of the processes described in this specification and their various modifications (subsequently referred to as "the processes") may be controlled at least in part, by one or more computers using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with controlling the processes can be performed by one or more programmable processors executing one or more computer programs to control all or some of the well formation operations described previously. All or part of the processes can be controlled by special purpose logic circuitry, such as, an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A method comprising:
   pumping first fluid into a wellbore to fill, at least partly, a region in a lost circulation zone that extends from the wellbore into a fracture in a formation, the wellbore extending at least partly through a subterranean formation having a feature that causes the lost circulation zone, the first fluid comprising formation fluid and having a first density; and
   after pumping the first fluid, pumping second fluid into the wellbore to fill at least part of the lost circulation zone, the second fluid having a second density that is greater than the first density, the pumping causing the second fluid to force the first fluid away from the wellbore so that the second fluid occupies a space of the lost circulation zone that is adjacent to the wellbore; and pumping cement slurry into the wellbore to force the second fluid further into the lost circulation zone so that the cement slurry occupies the space of the lost circulation zone that is adjacent to the wellbore, the cement slurry having a third density, the second density being greater than the third density causing the second fluid at least partly to prevent the cement slurry from mixing with the first fluid in the lost circulation zone for at least a period of time;
where second fluid is pumped into the wellbore using a force that is sufficient to cause the second fluid to enter the feature and to displace at least some of the first fluid at a region of the feature that is adjacent to the wellbore; and
where the cement slurry is pumped using a force that is sufficient to cause at least some of the cement slurry to enter the feature between the second fluid and the wellbore.

2. The method of claim 1, where the method further comprises forming the wellbore by drilling through the formation using the second fluid.

3. The method of claim 1,
where the second fluid comprises formation fluid.

4. The method of claim 1, where the second fluid comprises formation fluid, and where the first fluid has a first viscosity and the formation fluid has a second viscosity, the first viscosity being greater than the second viscosity.

5. The method of claim 1, where the first fluid prevents the cement slurry from mixing with the second fluid in the lost circulation zone for sufficient time to allow the cement slurry to harden into cement.

6. The method of claim 1, where pumping the cement slurry is performed immediately following pumping the first fluid.

7. The method of claim 1, where the period of time is an amount of time that it takes for the cement slurry to set to a threshold amount.

8. The method of claim 1, wherein the first fluid abuts the second fluid, and wherein the first fluid abuts the cement slurry.

9. A system comprising:
a detector to identify a lost circulation zone in a wellbore of a well, the wellbore extending at least partly through a subterranean formation having a feature that causes the lost circulation zone, the lost circulation zone extending from the wellbore into a fracture in a formation, the lost circulation zone containing a first fluid having a first density, the first fluid comprising formation fluid;
one or more pumps that are controllable to perform operations comprising:
pumping second fluid into the wellbore to fill at least part of the lost circulation zone, the second fluid having a second density that is greater than the first density, the pumping causing the second fluid to force the first fluid away from the wellbore so that the second fluid occupies a space of the lost circulation zone that is adjacent to the wellbore; and
pumping cement slurry into the wellbore to force the second fluid further into the lost circulation zone so that the cement slurry occupies the space of the lost circulation zone that is adjacent to the wellbore, the cement slurry having a third density, the second density being greater than the third density causing the second fluid at least partly to prevent the cement slurry from mixing with the first fluid in the lost circulation zone for at least a period of time;
a casing inside at least part of the wellbore; and
a cement retainer connected to the casing to direct the cement slurry into the wellbore;
where the one or more pumps are controllable to pump the second fluid into the wellbore using a force that is sufficient to cause the second fluid to enter the feature and to displace at least some of the first fluid at a region of the feature that is adjacent to the wellbore; and
where the one or more pumps are controllable to pump the cement slurry using a force that is sufficient to cause at least some of the cement slurry to enter the feature between the second fluid and the wellbore.

10. The system of claim 9, where the detector comprises a computing system programmed to receive information representing flow of fluid out of the wellbore following flow of fluid into the wellbore.

11. The system of claim 9, where the period of time is an amount of time that it takes for the cement slurry to set to a threshold amount.

12. The system of claim 9, where the period of time is at least four hours.

13. The system of claim 9, where the first fluid has a first viscosity, the second fluid has a second viscosity, and the second viscosity is greater than the first viscosity.

14. The system of claim 9, wherein the first fluid comprises drilling fluid.

15. The system of claim 9, wherein the second fluid comprises formation fluid that is native to the fracture.

16. The system of claim 9, wherein the detector is configured to detect the lost circulation zone based on a volume of drilling fluid removed from the wellbore.

17. The system of claim 9, wherein the second fluid has a density in a range of 65 pounds per cubic foot (PCF) and 130 PCF.

18. The system of claim 9, wherein the second fluid abuts the first fluid in the fracture.

19. The system of claim 9, wherein the cement slurry abuts the second fluid in the fracture.

* * * * *